United States Patent [19]

Pennell et al.

[11] 4,053,359
[45] Oct. 11, 1977

[54] NUCLEAR REACTOR

[75] Inventors: William E. Pennell, Greensburg; William J. Rowan, Monroeville, both of Pa.

[73] Assignee: The United States of America as represented by the United States Energy Research and Development Administration, Washington, D.C.

[21] Appl. No.: 667,734

[22] Filed: Mar. 17, 1976

Related U.S. Application Data

[63] Continuation of Ser. No. 503,148, Sept. 4, 1974, abandoned.

[51] Int. Cl.² .............................................. G21C 15/02
[52] U.S. Cl. ....................................... 176/61; 176/40; 176/50
[58] Field of Search ............................. 176/40, 50, 61

[56] References Cited

U.S. PATENT DOCUMENTS

| | | | |
|---|---|---|---|
| 3,350,277 | 10/1967 | Costes | 176/87 |
| 3,736,226 | 5/1973 | Sakurama | 176/50 |
| 3,888,731 | 6/1975 | Finch et al. | 176/50 |

*Primary Examiner*—Samuel W. Engle
*Assistant Examiner*—S. A. Cangialosi
*Attorney, Agent, or Firm*—Edward L. Levine; Z. L. Dermer

[57] ABSTRACT

A nuclear reactor in which the core components, including fuel-rod assemblies, control-rod assemblies, fertile rod-assemblies, and removable shielding assemblies, are supported by a plurality of separate inlet modular units. These units are referred to as inlet module units to distinguish them from the modules of the upper internals of the reactor. The modular units are supported, each removable independently of the others, in liners in the supporting structure for the lower internals of the reactor. The core assemblies are removably supported in integral receptacles or sockets of the modular units. The liners, units, sockets and assmblies have inlet openings for entry of the fluid. The modular units are each removably mounted in the liners with fluid seals interposed between the opening in the liner and inlet module into which the fluid enters and the upper and lower portion of the liner. Each assembly is similarly mounted in a corresponding receptacle with fluid seals interposed between the openings where the fluid enters and the lower portion of the receptacle or fitting closely in these regions. As fluid flows along each core assembly a pressure drop is produced along the fluid so that the fluid which emerges from each core assembly is at a lower pressure than the fluid which enters the core assembly. However because of the seals interposed in the mountings of the units and assemblies the pressures above and below the units and assemblies are balanced and the units are held in the liners and the assemblies are held in the receptacles by their weights as they have a higher specific gravity than the fluid. The low-pressure spaces between each module and its liner and between each core assembly and its module is vented to the low-pressure regions of the vessel to assure that fluid which leaks through the seals does not accumulate and destroy the hydraulic balance.

3 Claims, 23 Drawing Figures

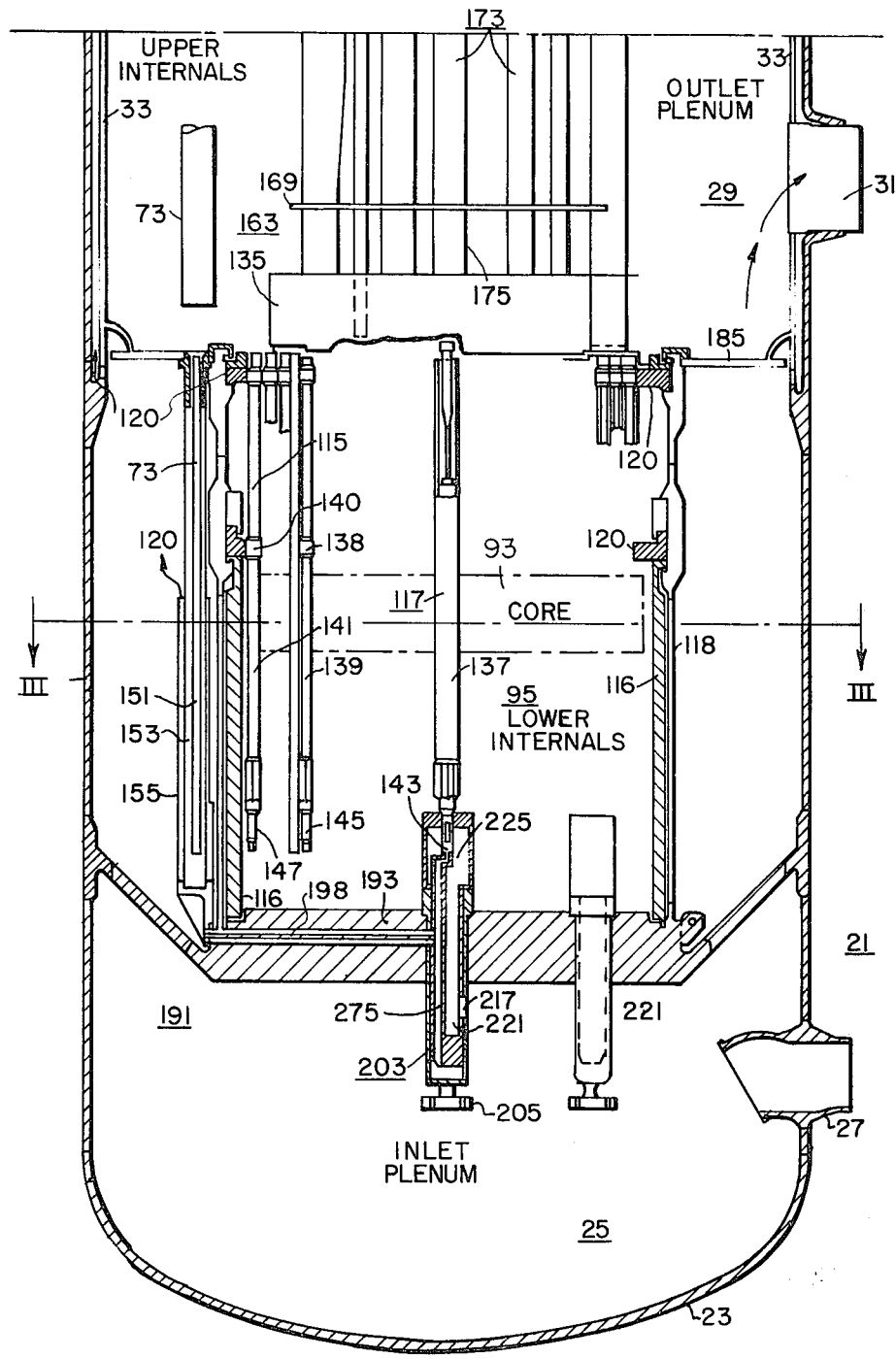
FIG. IB

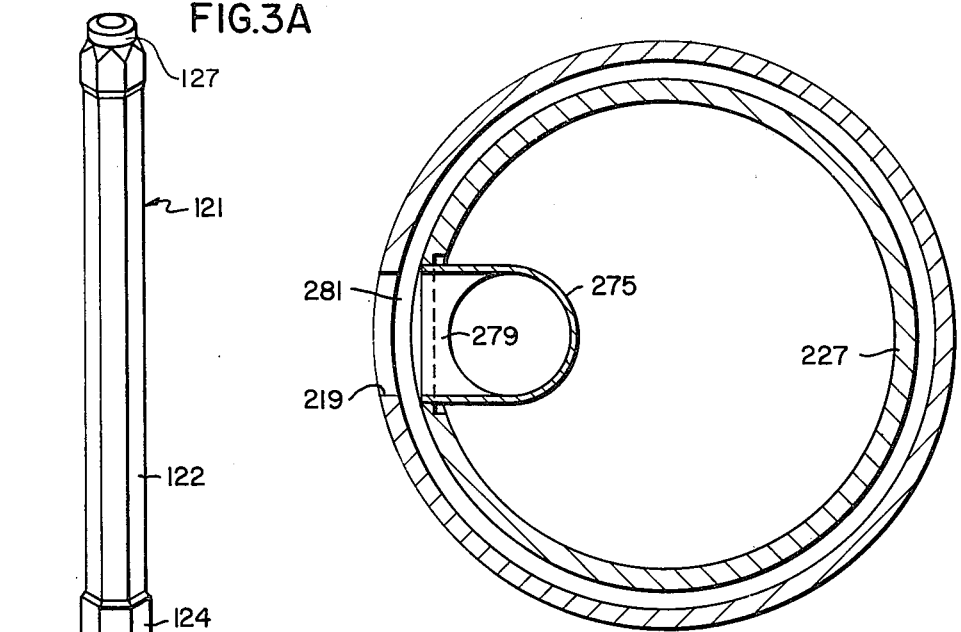
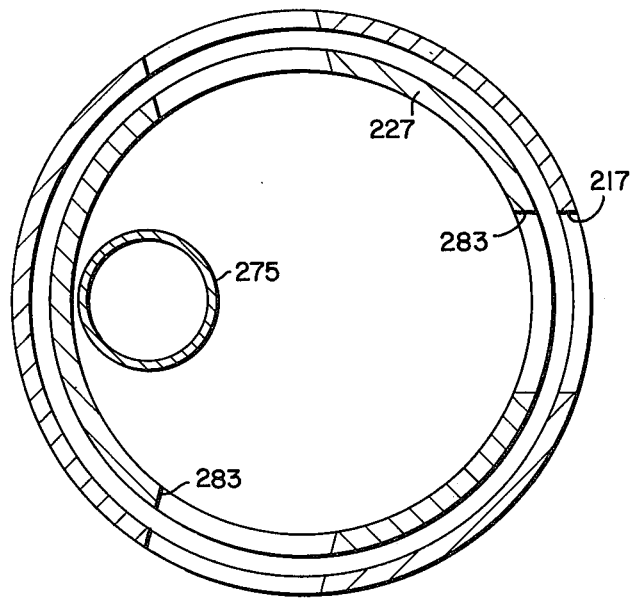

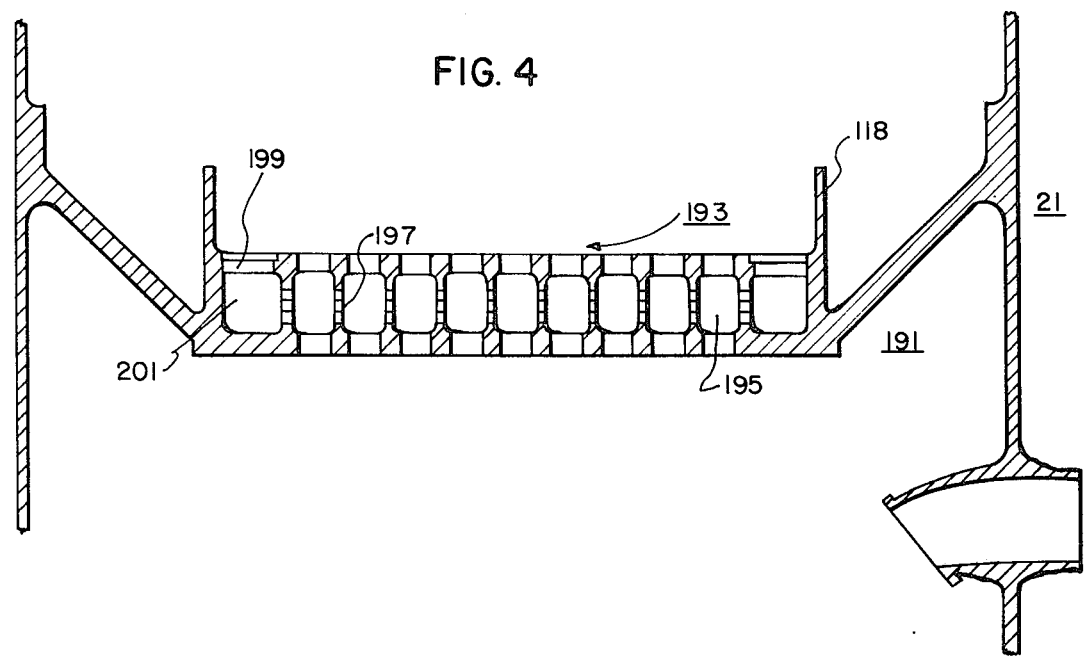
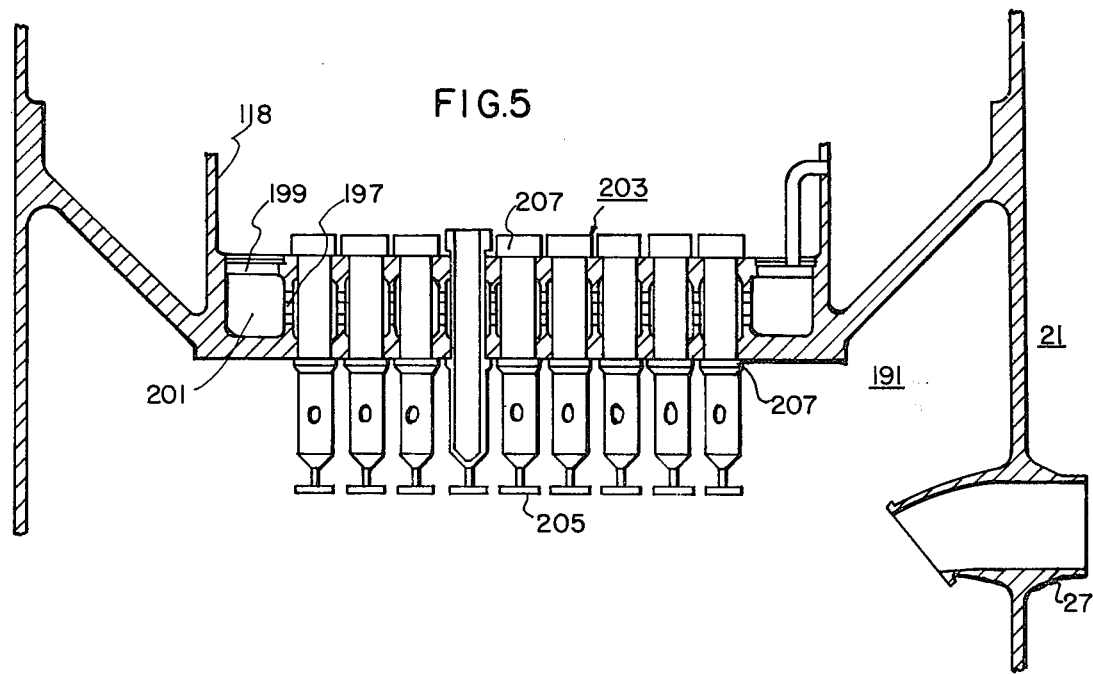

NUCLEAR REACTOR

The invention described herewin was made in the course of, or under, a contract with the U.S. Energy Research and Development Administration (ERDA),- successor in interest to the U.S. Atomic Energy Commission.

CROSS REFERENCE TO RELATED APPLICATION

This is a continuation of application Ser. No. 503,148 filed Sep. 4, 1974, now abandoned.

This application relates to, and incorporates by reference the following application, assigned to Westinghouse Electric Corporation:

Application Ser. No. 503,149 filed concurrently herewith to J. A. Rylatt for Nuclear Reactor (herein called Rylatt application).

BACKGROUND OF THE INVENTION

This invention relates to the art of nuclear reactors and has particular relationship to the core-support structure of nuclear reactors. A nuclear reactor includes a pressure vessel into which a heat-transfer fluid, typically liquid sodium for fast breeder reactors or pressurized or boiling water for more conventional commercial reactors is pumped under pressure. The fluid flows through the core and is heated; the hot fluid emerges from the vessel and the heat flows via mechanically separated primary and secondary loops to electrical-power generating equipment. Within the vessel there is supporting structure for the core components. Typically for a liquid metal cooled, fast breeder nuclear reactor which generates more fissile fuel than it utilizes, these components include fuel-rod bundles or assemblies, control-rod assemblies, blanket fertile-material or fertile-rod assemblies and removable radial shielding assemblies. The expression "core assemblies" or "core component assemblies" or the word "assembly", when used in this application with reference to components of the core, means one or more types of these assemblies. The core-support structure serves the purposes of locating, supporting, distributing coolant to, and providing axial and radial restraint for, these assemblies.

These assemblies and their supports are composed of material which has a higher specific gravity than the fluid and in the absence of other forces, the core assemblies and their supports would be held in the pressure vessel by gravity. However, there are forces tending to counteract the weights of the assemblies and their support. The heat-transfer fluid is injected under pressure in the lower parts of the assemblies and is distributed to, and guided along, the assemblies. As the fluid flows along the assemblies there is a pressure drop along the fluid so that the fluid which emerges from the core is at a substantially lower pressure than the entering fluid and the resulting differential in pressure counteracts the gravity forces.

The practice, in accordance with the teachings of the prior art, has been to secure the supports for the core assemblies to the supporting structure. Typically a so-called "core-basket" concept was applied in a test facility of substantially smaller dimensions than a reactor serving to produce substantial power. A large number, in one typical case, one hundred fifty seven receptacles for the assemblies are welded to upper and lower plates of the core basket. These plates are joined by a cylindrical skirt and the whole welded structure including the assemblies forms a welded unit which is seated in the pressure vessel with fluid seals interposed between the skirt and the core support structure cavity. The seal is typically a piston ring of INCONEL nickel chromium alloy or like alloy having good fretting and wear characteristics when used in sliding contact with type 304 stainless steel, of which the vessel is typically composed, in liquid sodium. The fluid is injected at the periphery of the skirt between upper and lower seals; that is, laterally of the receptacles into which the core assemblies are inserted. A welded assembly as just described is costly even for a test facility. There are hundreds of welds each of which must be free of defects. So costly an assembly cannot be scrapped because there is an imperfect weld; the weld must be repaired. Because of the radial flow of the fluid, the distribution of the fluid among the assemblies may not be uniform; inner assemblies receive fluid at a lower pressure than those on the outside. For a reactor capable of producing substantial power, typically 975 megawatts at the reactor and about 300 megawatts at the electrical generators, these difficulties are multiplied. Such a reactor would require a support unit, typically about 100 inches in diameter with several hundred receptacles, those for the fertile fuel differing from each other and different from those for the fissile fuel. The making of a satisfactory large diameter piston-ring seal presents formidable problems.

In another prior-art reactor the core assemblies are supported in receptacles which are bolted to a supporting structure. The removal of receptacles from such apparatus for replacement or repair presents formidable difficulty. As a rule the reactor cannot be shut down and the vessel drained when repair or replacement is demanded. To remove a defective receptacle the bolts which are submerged under the fluid (liquid sodium) must be removed by remote manipulators, a difficult task.

It is an object of this invention to overcome the above-described difficulties and to provide a nuclear reactor, particularly a reactor of the sodium cooled, fast breeder type, capable of producing substantial power, whose core-supporting structure shall not impose the formidable structural engineering demands of prior-art structures, which shall be capable of being produced at reasonable cost, substantially lower than the cost of prior-art structure and which shall at the same time improve the distribution of cooling fluid to the core component assemblies. It is also an object of this invention to provide an assembly for supporting the core component assemblies of a nuclear reactor by whose use the above-described disadvantages of the prior art shall be overcome.

SUMMARY OF THE INVENTION

In accordance with this invention the core component assemblies, which in the illustrative embodiment include fuel assemblies, both fissile and fertile fuel containing types, fuel assemblies containing control rods and shielding assemblies which form the core of a liquid metal cooled fast breeder nuclear reactor, are separately supported in inlet-support modules or modular units. Each inlet-support modular unit is removably mounted, held only by gravity in liners in the lower core-support structure with fluid seals interposed between the aligned fluid inlet openings in the module and liner and the upper and lower parts of the module and liner. Each module directs flow of the heat-transfer or coolant fluid to a plurality (typically 7) of reactor component assemblies which are removably mounted, held only by gravity, in receptacles of the corresponding modular unit. Below the seal each module is subjected to low pressure which balances the low pressure in the region where the fluid emerges from the core components. The low pressure in the volume below the module lower seal is generated and maintained by venting this volume to the low pressure regions of the vessel of the reactor. Gravity is adequate to hold the modules in the liner. The modular units are connected to provide controlled bypass flow to peripheral component assemblies and each module includes orificing to achieve proper flow distribution. These peripheral components which are cooled by the by-pass flow include the reactor-vessel thermal liner, the spent-fuel storage location, the core-restraint formers (ring around the core), and the radial shielding including both the fixed shielding and some of the removable shielding. Each modular unit includes a strainer flow distribution plate which collects loose debris and prevents the debris from directly blocking the core assemblies. The debris may be subsequently removed from the reactor; the module thus has a filtering capability. Each modular unit has a by-pass flow vent pipe through which fluid which leaks below each module passed the seal can be removed or flow through the assemblies can be controlled by variable by-pass flow through the vent pipe. The modules can be designed for the life of the reactor but are readily removable for maintenance or replacement. The fluid is injected below the liners rather than radially and the fluid is uniformly distributed to all modules. The modules have the same outside dimensions so that they can be accommodated by like liners. Discriminator features assure that modules are positioned only in their assigned locations. Internally the modules differ in accordance with their functions and flow requirements. Typically there may be ten different internal structures among the modules.

The typical 975 Mwt. liquid metal cooled fast breeder reactor mentioned has 198 hexagonal-core fuel assemblies surrounded by 150 radial blanket assemblies and 324 radial shield assemblies. In this typical reactor the assemblies are received in 61 inlet modules each having 7 receptacles. The velocity of the heat-transfer or cooling fluid, which is sodium, and its distribution varies with the character of the component or assembly which it cools. The velocity is about 30 feet per second in non-replaceable components while in replaceable components it may be as high as 50 feet per second at the inlet-lower-temperature end and 40 feet per second at the outlet-higher-temperature end. In the fuel rod bundles it is 25 feet per second. Eighty percent of the fluid is allocated to the core, 12% to the radial blanket, 1.6% to control assemblies, and the remainder to shielding, by-pass and leakage.

The apparatus according to this invention has the following advantages:

1. Improved flow distribution because the inlet flow from the inlet plenum is upward, directly to all modules, rather than radially as in the prior art directly to the peripheral modules but in circuitous paths to the inner modules.

2. Improved maintenance and replacement capability because the modules are readily removable. Since all assemblies with high maintenance or replacement potential are inserted in the modules, these assemblies can be readily removed for maintenance or replacement.

3. Creation of new technology to produce a seal in the form of a piston ring of very large diameter is avoided.

4. Fabrication is simplified; the forming of a single structure having a large number of welds any of which may have cracks requiring repair is avoided.

5. Ready replacement of modules and their receptacles is afforded.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIGS. 1A and 1B together are a view in longitudinal section (or a view in elevation with the vessel open) of a nuclear reactor in accordance with this invention;

FIG. 3A is a view in side elevation showing a fuel-rod assembly;

FIG. 4 is a fragmental view in longitudinal section, partly diagrammatic, showing the support for the inlet modular units of the reactor shown in FIG. 1;

FIG. 5 is a fragmental view similar to FIG. 4 but showing the liners in the support;

FIGS. 13, 14, 15, 16, 17, 18 are views in section taken along lines XIII—XIII, XIV—XIV, XV—XV, XVI—XVI, XVII—XVII and XVIII—XVIII respectively of FIG. 10.

Figure 6:
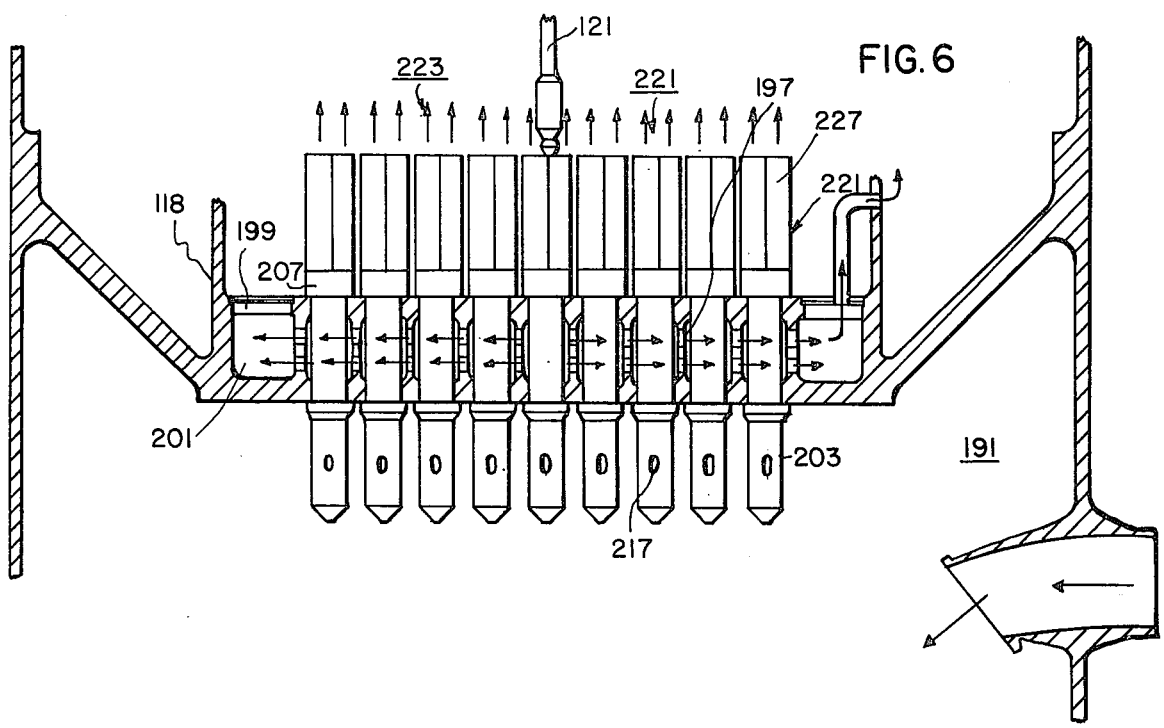
FIG. 6 is a fragmental view similar to FIGS. 4 and 5 but showing the inlet modular units mounted in the liners.
Figure 13:
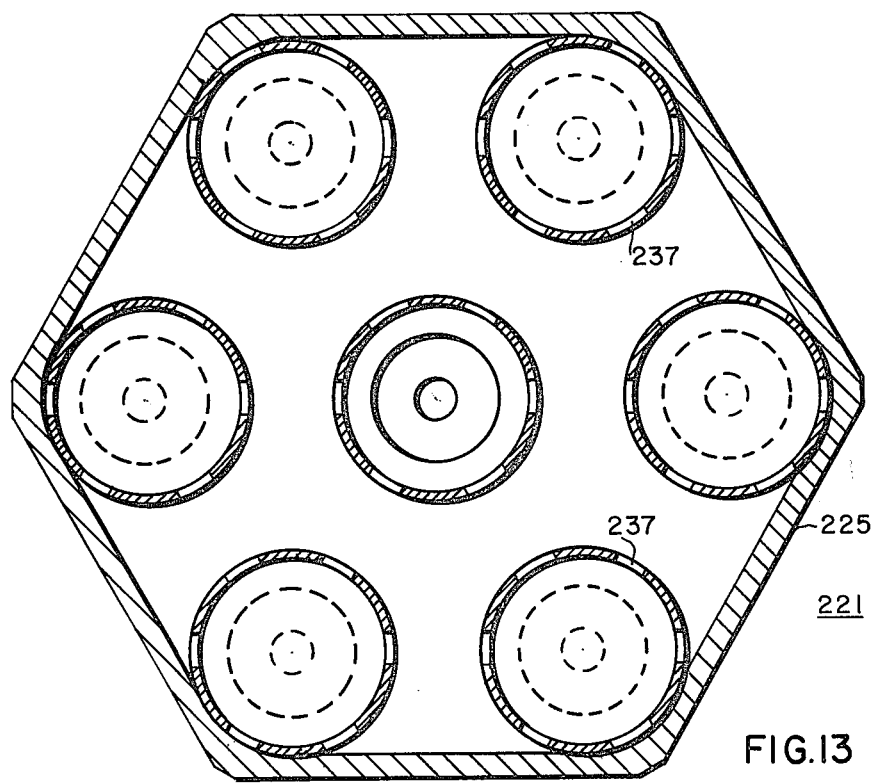
Figure 7:
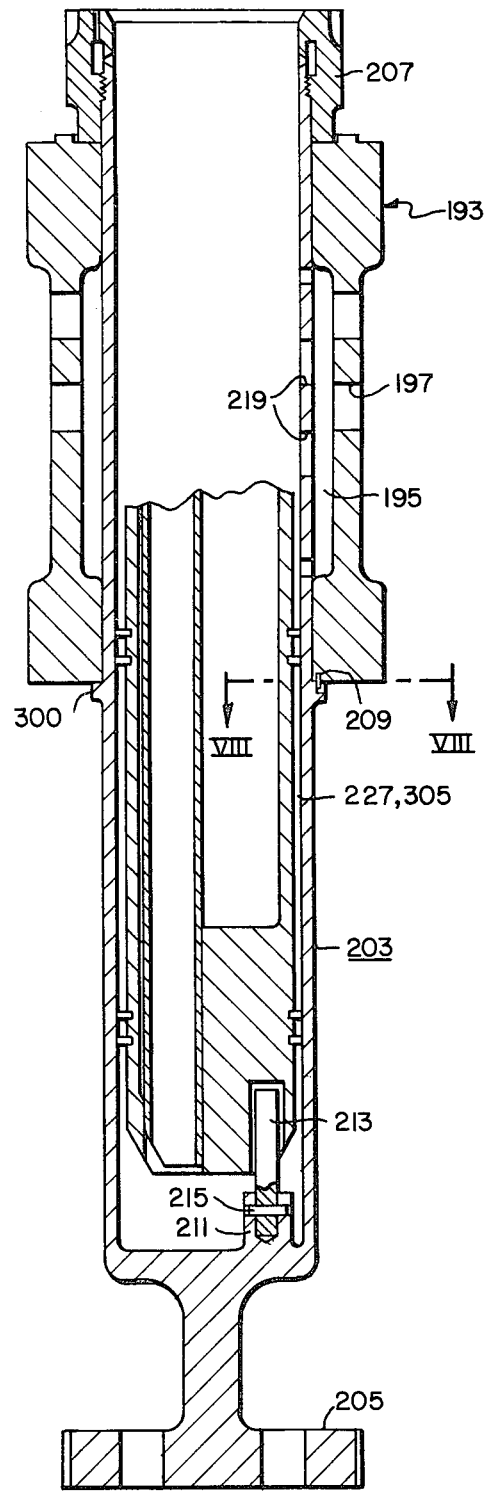
FIG. 7 is a view in longitudinal section of the liner in which each inlet modular unit is mounted.
Figure 8:
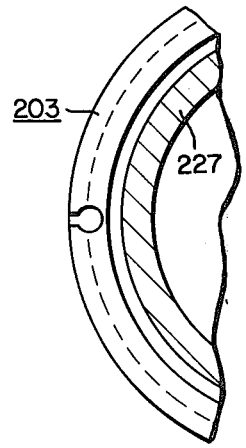
FIG. 8 is a view in section taken along line VIII—VIII of FIG. 7.
Figure 9:
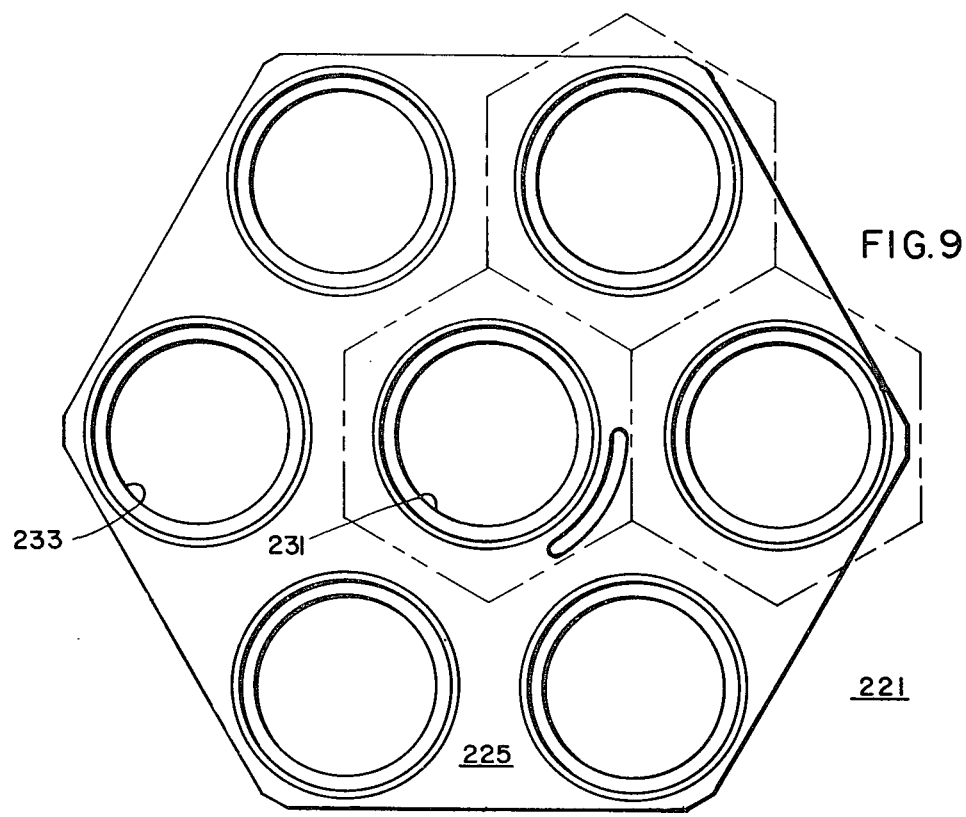
FIG. 9 is a plan view of the top of an inlet modular unit of one type.
Figure 14:
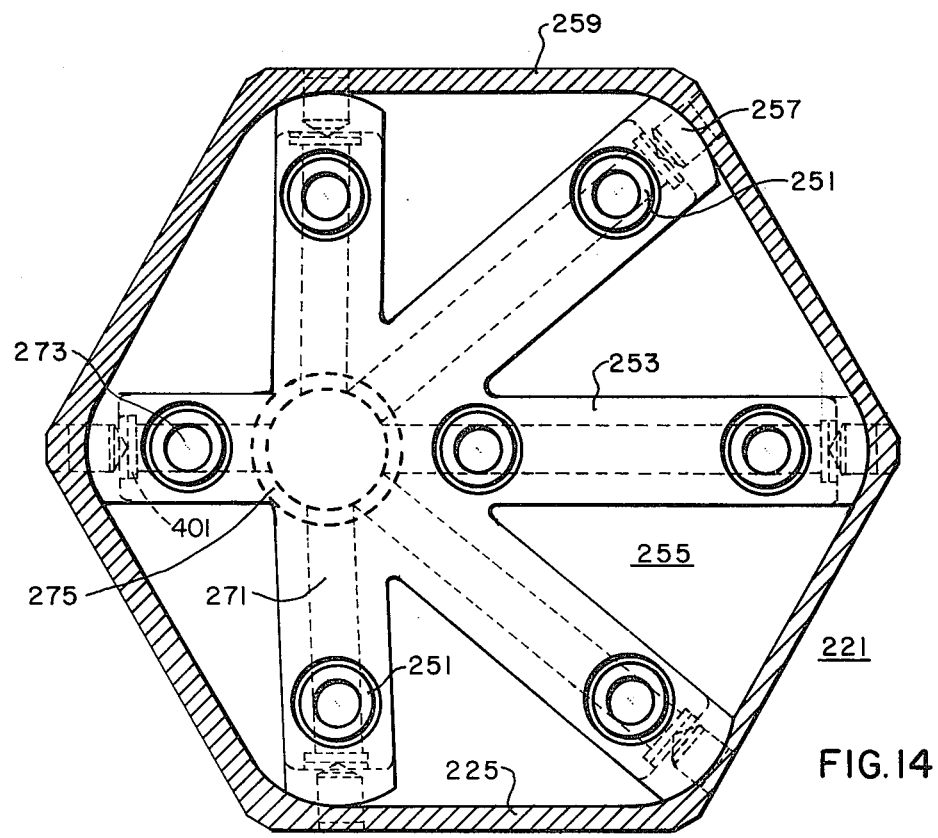

The supporting structure shown in FIG. 1 differs from the supporting structure shown in FIGS. 4, 5, and 6 in that the former shows an integral plate connected to the trapezoidal skirt and the latter show a composite plate of a disc and a ring. However, for the purpose of this invention, the difference is not significant. (See Rylatt application)

DETAILED DESCRIPTION OF EMBODIMENT

Figure 1A:
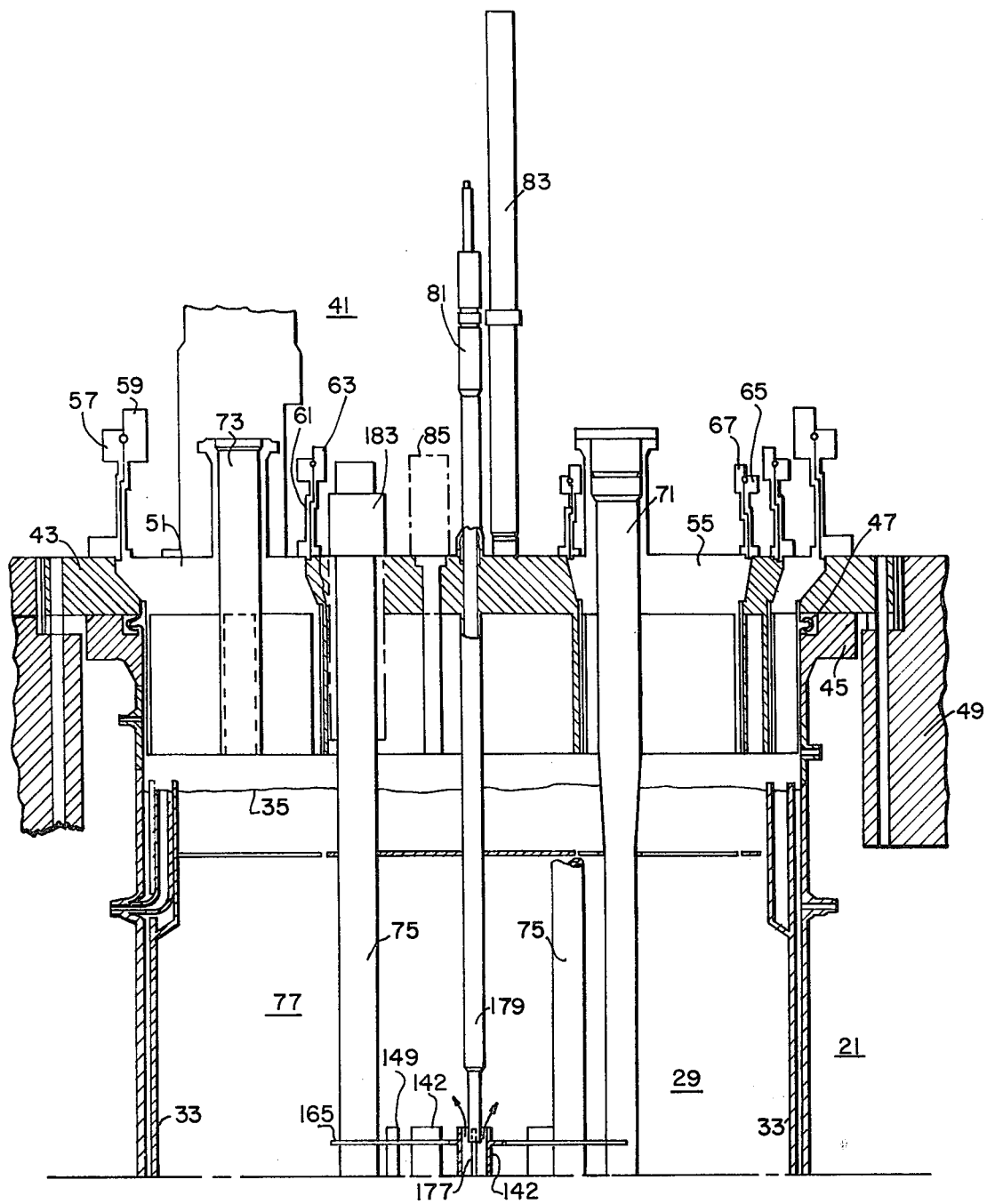

The reactor shown in the drawings includes a generally cylindrical pressure vessel 21 closed at the bottom by a bell 23 which bounds an inlet plenum 25. The vessel 21 has a plurality of inlet nozzles 27 about the bell 23 through which a heat-transfer or cooling fluid such as liquid sodium is supplied to the plenum 25 under pressure. The vessel 21 has an outlet plenum 29 from which the hot fluid is derived through a plurality of outlet nozzles 31. The vessel is provided with a thermal liner 33 encircling the outlet plenum 29 and the regions above and below the outlet plenum. The permissible upper level and the minimum safe lower level of the fluid are indicated in FIGS. 1A and 1B by wavy lines 35 and 37. Above the surface (37) of the fluid there is an inert gas such as argon at low positive differential gauge pressure above atmospheric pressure (about 2 or 3 inches of water).

At the top the vessel 21 is closed by a head 41. The head 41 has a stationary outer ring 43 which is bolted to a flange 45 of the vessel 21. The joint of the ring 43 and flange 45 is sealed internally (of the bolts not shown) by an omega seal 47. The vessel 21 is supported on a support ledge 49 of a concrete containment. The ring 43 is bolted to the ledge 49. The head 41 has a plurality of rotating plugs 51, 53, 55 which are sealed to prevent leakage of the reactor cover gas to the containment building atmosphere. Plug 51, of largest diameter, is coaxial with the vessel. The stationary ring 43 supports the plug 51 through an annular riser 57 and a bearing 59 (FIG. 1). Plug 53, of intermediate diameter, and plug 55, of smallest diameter, are excentric to the axis of the vessel 21. Plug 51 supports plug 53 through an annular riser 61 and a bearing 63 and plug 53 supports plug 55 through an annular riser 65 and a bearing 67. The risers 57, 61 and 65 are cylindrical extensions above the periphery of the stationary ring 43, the plug 51 and the plug 53. The risers 57, 61, 65 serve to mount the bearings 59, 63, 67, pressure seals (not shown) for the plugs and part of the gearing (not shown) for driving the plugs. The rotating plugs 51, 53, 55 position the fuel and control handling equipment over all core assembly locations.

Figure 2:
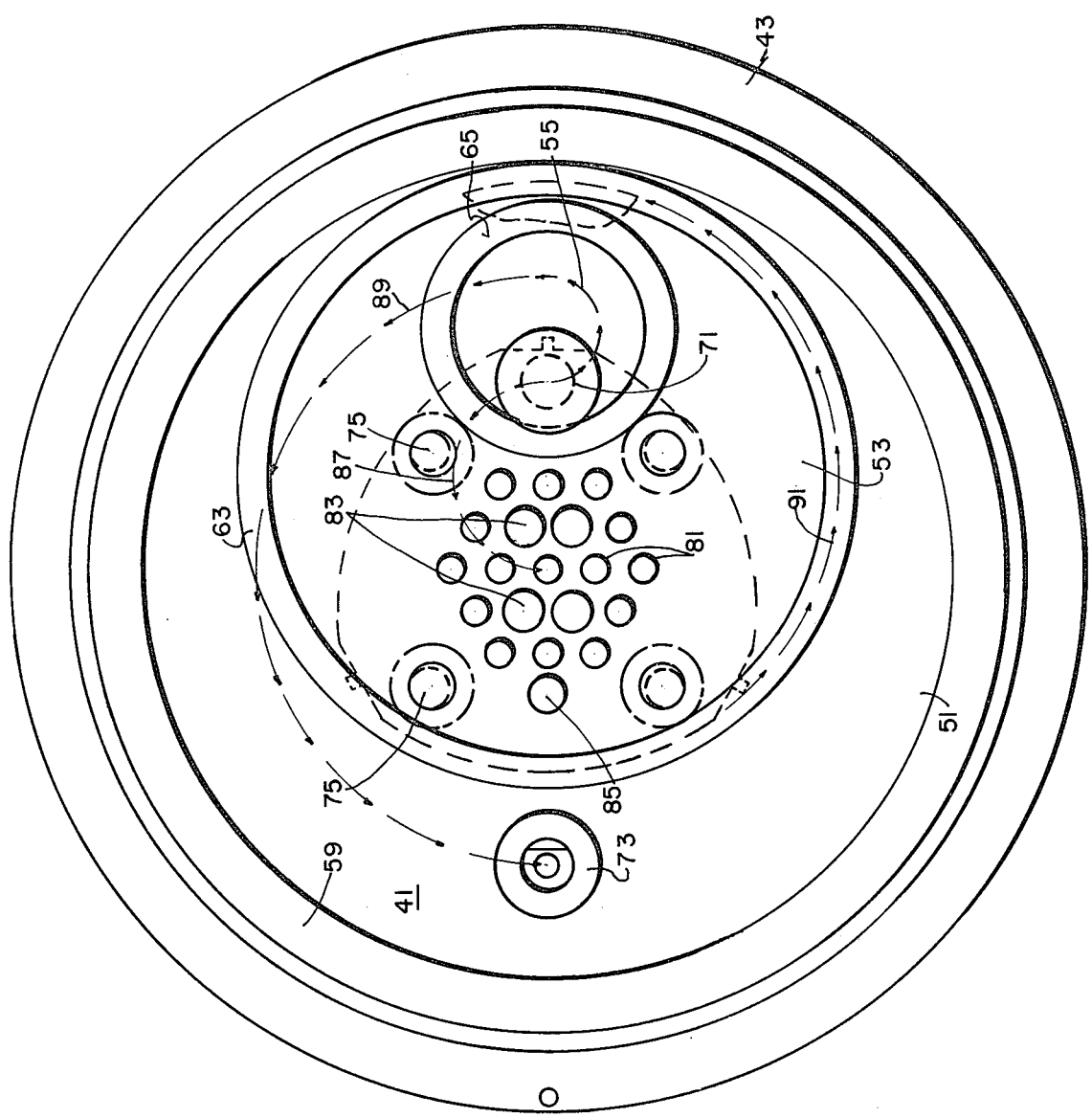
FIG. 2 is a plan view of the top of the reactor shown in FIG. 1.

The plug 55 supports an in-vessel transfer machine port 71 excentrically. The plug 51 supports the ex-vessel transfer machine port 73 excentrically. The plug 53 supports columns 75 which support the upper internals 77, the primary control-rod assembly drive mechanisms 81, the auxiliary control-rod drive mechanisms 83, and one or more sealed surveillance ports 85. By rotating the plugs 51, 53, 55 the in-vessel transfer machine port 71 can be positioned over the various components within the vessel as shown by the arrows 87 (FIG. 2) and over the ex-vessel transfer machine port 73 as shown by the arrows 89. During the rotation of plug 53, the column 75, the control-assembly drives 81 and 83 and the port 85 are rotated as shown by the arrows 91. When the plugs 51, 53, 55 are being rotated, the drives 81 and 83 are disconnected from the driven parts. Typically, the in-vessel transfer machine port 81 is positioned over the fuel transfer ports after the plugs 51, 53, 55 are each rotated through 180°.

Within the vessel 21 there are, in addition to the upper internals 77, the core 93 and the lower internals 95. The core includes an inner zone 101 of fuel assemblies 103 (typically 108 in number) of lower enrichment (typically 18.7%, labeled IC) and an outer zone 105 of fuel assemblies 107 (typically 90) of higher enrichment (typically 27.1%, labeled OC). Around the zone 105 there is a radical blanket 109 of radial blanket assemblies 111 (typically 150, labeled RB). Around the zone 109 there is a zone 113 of removable radial shielding assemblies 115 labeled RS. About the removable shield 115 there is a fixed shield 116. The fixed shield is enclosed by a core barrel 118. Core restraint former rings 120 are provided spaced along the core for restraining deformation of the core.

Figure 3:
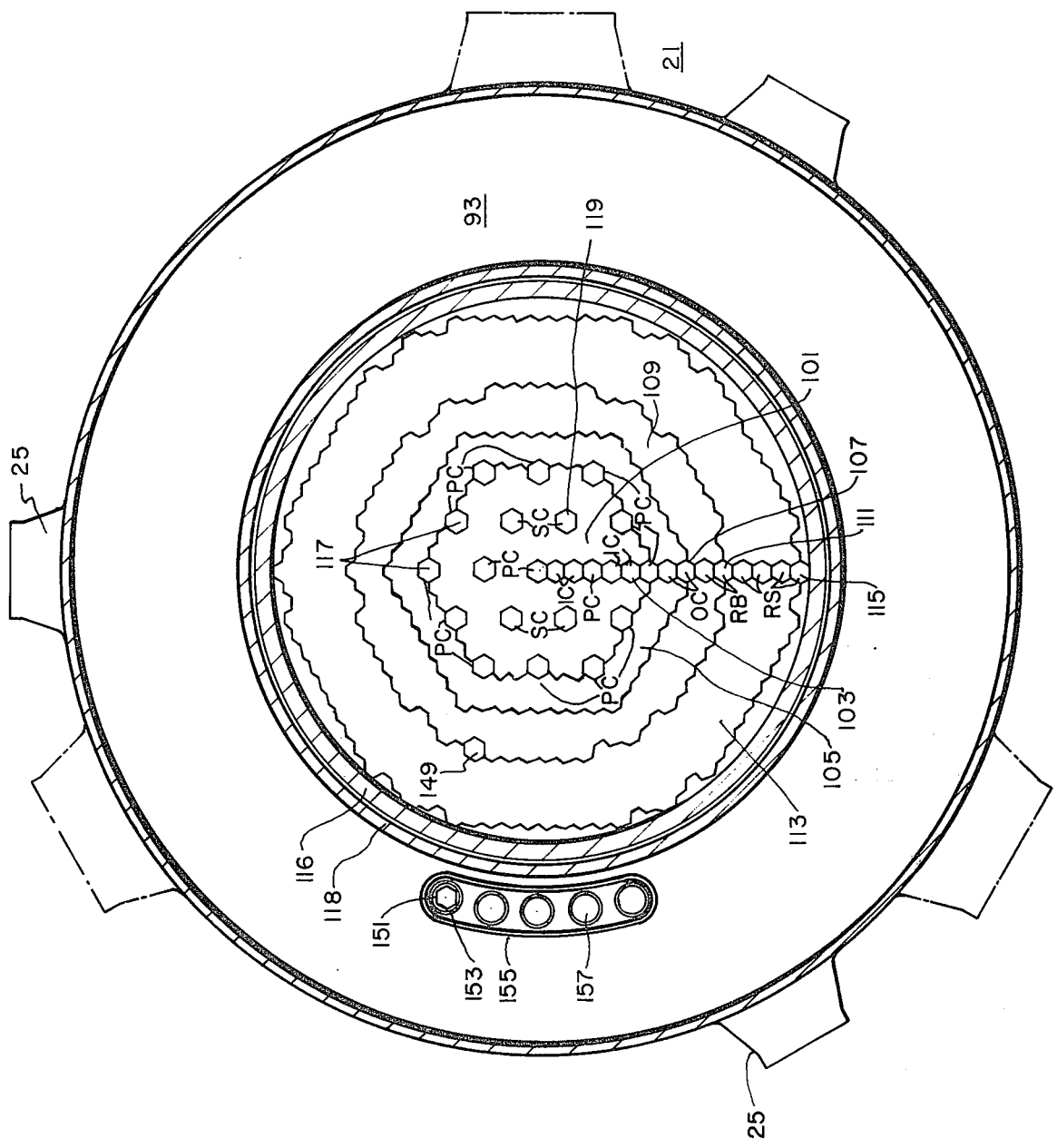
FIG. 3 is a view in transverse section taken along line III—III of FIG. 1 showing the core components.

The inner zone 101 includes, in addition to the fuel assemblies, primary control-rod assemblies 117 (typically 15 in number, labeled PC) and secondary control-rod assemblies 119 (typically 4 in number, labeled SC). The control-rod assembly drives 81 and 83 can be set so that control-rod assemblies 117 are either completely removed or positioned at any axial position within the core 93. The lower and higher enrichments in the zones 101 and 105 promote uniform power generation across the core 93. Typically, each fuel-rod assembly contains 217 fuel rods. The fuel rod bundle (FIG. 3A) is contained within a thin-walled hexagonal duct 121 which serves to guide the heat-transfer fluid through the assembly and to protect the bundle during handling. The fuel pins have a plenum 122 above the fuel and axial blanket sections for containing gaseous fission products. There is a core restraint load pad 124 intermediate the ends of the duct 121. A rod attachment facility (not shown) is provided in the lower part of the duct 121 to provide for uniform flow distribution and axial restraint of the rods. The attachment sub-assembly rails mate with a keyhole slot in the bottom end-cap 123 of the duct in a discriminatory manner to prevent mixing of different enrichments. The duct 121 has an inlet nozzle 125 and an outlet nozzle 127. The inlet nozzle has a lateral opening 129 through which fluid is admitted to the duct 121. Below this opening there is a circumferential slot 131 for a piston ring which seals the region below the opening 129 against fluid flow when the assembly is inserted in a socket. The duct may contain orifice plates (not shown) for controlling the flow of the fluid. At the end of inlet nozzle 125, there is a discrimination port 133 which assures that the fuel assembly 103 or 107 cannot be inserted in a control-rod position. The outlet nozzle 127 directs fluid flow to a cellular flow collector within a shield or shroud 135 in the upper internals 77.

The primary function of the radial blanket assemblies 111 is to convert fertile material (typically depleted U-238) into fissile material (typically Pu) by neutron capture. A secondary function of assemblies 111 is to absorb and reflect neutrons from the fuel assemblies 103 and 107, thus to shield the structures outside of the blanket. The radial blanket assemblies 111 also generate energy. An operational feature of the radial blanket 109 is the facility for shuffling of the assemblies 111 from positions adjacent zone 105 to peripheral positions. Fresh fertile assemblies in the inner rows of the radial blanket 109 generate little energy because of the absence of fissionable material. As the fissionable material increases the generated energy increases. By moving the assemblies 111 to outer rows of blanket 109, the raising of the cladding to excessive temperatures beyond design limits is avoided. Shuffling of radial assemblies equalizes the energy generated in the radial blanket 109 and reduces radial temperature gradients. Typically shuffling of the assemblies 111 is performed annually during refueling. The control-rod assemblies 117 and 119, the blanket assemblies 111 and radial-shielding assemblies 115 have ducts 137, 139, 141 of the same contour as the ducts 21 with core restraint load pads 136, 138, 140 and inlet nozzles 143, 145 and 147 as described above.

The core 93 includes a surveillance specimen 149 adjacent the blanket 109 and another specimen 151 adjacent the barrel 118. The surveillance specimen 151 is encircled by flow guides 153 and 155. There are also fuel-transfer and storage containers 157 adjacent the barrel 118 and also encircled by flow guide 155.

The upper internal structure 77 is supported by a weldment including the support columns 75 and sandwich-plate structures 161 and 163 including the plates 165, 167, 169, 171 which are welded to the columns 75. Outlet modules 173, which duct the core outlet flow to the upper region of the outlet plenum 29, are housed within stub tubes 175 in the sandwich plates 161 and 163. Control rod shroud tubes 177, centered within their respective chimneys 142 of outlet modules 173, mate at their upper ends with shroud-tube extensions 179 suspended from the intermediate rotating plug 53. At their lower ends the control-rod shroud tubes 177 plug into the control-assembly ducts 137. The entire upper internal structure is supported from the intermediate rotating plug 53 through jacking-seal units 183 (not shown in detail). This structure is located at the lower end by keys which engage in slots in the core barrel upper structure. A thermal baffle 185 is provided below the cellular-flow collector in the shroud 135.

The upper internals 77 maintain alignment between the fuel-control assemblies 117 and 119 and their associated drives 81 and 83. The upper internals also collect the core coolant fluid and channel it through the shroud tubes. By channeling the coolant flow parallel of the control-rod drive line 179, cross-flow induced vibration to the drive line is prevented. The channeled coolant also promotes mixing in the outlet plenum 29 reducing the effects of thermal transients on the outlet plenum structure and the outlet nozzle 31. The upper internals 77 function to:

1. Provide a backup mechanical hold-down for the core 93 in the event of a malfunction of the core hydraulic hold-down system.
2. Position, protect, guide and support the core instrumentation.
3. Assure alignment of the control-rod system under steady state and seismic conditions and protect the control-rod drive line 179 from flow induced vibration.
4. Control flow in the vessel outlet plenum 29 to minimize flow stratification during a scram transient.

The lower internals 95 (FIGS. 4 through 19) include a support plate 191 (FIG. 4) in the form of an inverted truncated cone which is welded integrally with the vessel 21. The core barrel 118 is welded to the periphery of the horizontal plate 193 of this support. Throughout the horizontal plate 193 there are a plurality of openings 195 each shouldered at the top and bottom. The shouldered holds have by-pass openings 197. The plate 193 also has by-pass channels 198 (FIG. 1) throughout. Around the periphery of the plate 193, connected to the weld 199 which joins the barrel 118 to the plate, there are radial-shear webs 201.

A liner 203 (FIGS. 5, 7, 8) are slideably mounted in each opening 195. The liner is of generally hollow cylindrical form. From the bottom of the liner 203 a flow-distribution and blockage-prevention disc 205 is suspended into the inlet plenum 25. The liner 203 is suspended from the top of plate 193 by a collar 207 which is screwed into and welded to the liner 203 and engages the plate 193 along a recess about the corresponding opening 195. The liner 203 has a shoulder 300 which engages the bottom of plate 193 about the opening 195 and is circumferentially positioned by a pin 209. A boss 211 extends upwardly from the inner base of the liner 203. An alignment post 213 is held in the boss 211 by a dowel pin 215. The post 213 may differ for different modules that are inserted in the liner 203 and in addition to aligning the module may assure that each liner receives the proper module. The liner has a slotted opening 217 below the plate 193 for admitting the fluid from the inlet plenum 25 under pressure. The liner also has holes 219 coextensive with the by-pass holes 197 on one side of the opening 195 for transmitting by-pass fluid to the low-pressure peripheral region of the vessel 21.

A modular unit 221 (FIGS. 9 and 10) or 223 (FIGS. 11 and 12) is removably mounted in each of the liners 203. The modular unit 221 or 223 which is mounted in a liner 203 in any position of plate 193 depends on the purpose which it is to serve. Unit 221 receives fuel assemblies 103 or 107 or control-rod assemblies 117 or 119 which require high fluid-cooling flow; units 223 receive blanket assemblies 111 or removable shielding assemblies 115.

The modular unit 221 (FIGS. 9, 10A, 10B, 10C) is an elongated member having a partially hollow hexagonal head 225 and a hollow cylindrical stem 227 extending from a shoulder of the head 225; the stem is tapered at the bottom and has a hole 230 for receiving the aligning pin 213 of the liner 203. The top 229 of the head has a plurality of openings into which receptacles 231 and 233 of different types are seated and secured. Each receptacle 231 or 233 is of hollow cylindrical form internally dimensioned to receive the inlet nozzle 125 (FIG. 3A) of the duct 121 of a fuel assembly 103 or 107 or the duct of a control-rod assembly 117 or 119 or of a fertile-rod assembly 139 or of a removable shield assembly 141. A fuel-assembly duct 121 is shown in broken lines inserted in the receptacle 231. Receptacle 233 differs from 231 in that it includes a block 235 representative of the several different discriminator parts which are secured by pins 400 in the receptacle to discriminate between the different assemblies which each receives. Each receptacle 231 or 233 has slots 237 which are aligned with the slots 129 in the ducts of the assembly inserted in the receptacle. As shown with respect to receptacle 231, the assembly has piston rings 239 and 241, or other seals, above and below the slots 237. These rings 239 and 241 prevent the fluid under pressure which enters the slots 237 from penetrating to any substantial extent into the low-pressure regions above ring 239 or below ring 241. In lieu of the seals 239 and 241, the inlet nozzle of duct 121 or 123 may be a close fit in the mating part of the receptacle 231; the fluid which penetrates to low pressure regions of the receptacle is in any event vented. The assembly 103, 107, 117 or 119, as the case may be, has a greater specific gravity than the fluid. Because the pressure above and below the assembly is balanced, the assembly remains in the receptacle 231 or 233, as the case may be, under its own weight.

Each receptacle 231 or 233 tapers into a hollow stud 251 at the lower end and is secured by engagement of its stud 251 in the arms 253 of a spider 255. The spider 255 is secured by pins 257 to the wall 259 of the head 225. Peripheral seals 261 are provided between each stud and the wall of the arm 253 which it engages to prevent leakage of the fluid, which is under pressure around the stud 251, through the joint between the stud 251 and the arm 253.

Bosses 263 extend from the lower faces of the arms 253 of the spider 255. A strainer flow-distribution plate 265 for the fluid, which distributes the fluid and prevents the flow of solid debris into the receptacles 231 or 233, engages these bosses 263 and is secured to them by rings 267.

Each arm 253 of the spider 255 has a cavity 271. The hole 273 in each stud 251 communicates with the interior of the corresponding receptacle 231 or 233 and with the cavity 271 permitting any leakage through the seal 241 to flow into the corresponding cavity 271. The cavity 271 is sealed by a cap 401.

The cavities 271 of each modular unit communicate with a by-pass-flow vent pipe 275 which extends from the spider 255 throughout the length of the module 221 and opens into a space 277 between the lower tip of the module and the liner 203. The pipe 275 also has lateral opening 279 which communicates with the channel 198 (FIG. 1) through aligned openings 219 in the wall of the linear 203 and 281 in the stem 227 of the module. Channel 198 transmits fluid to the lower-pressure regions of the vessel 21.

Figure 10A:
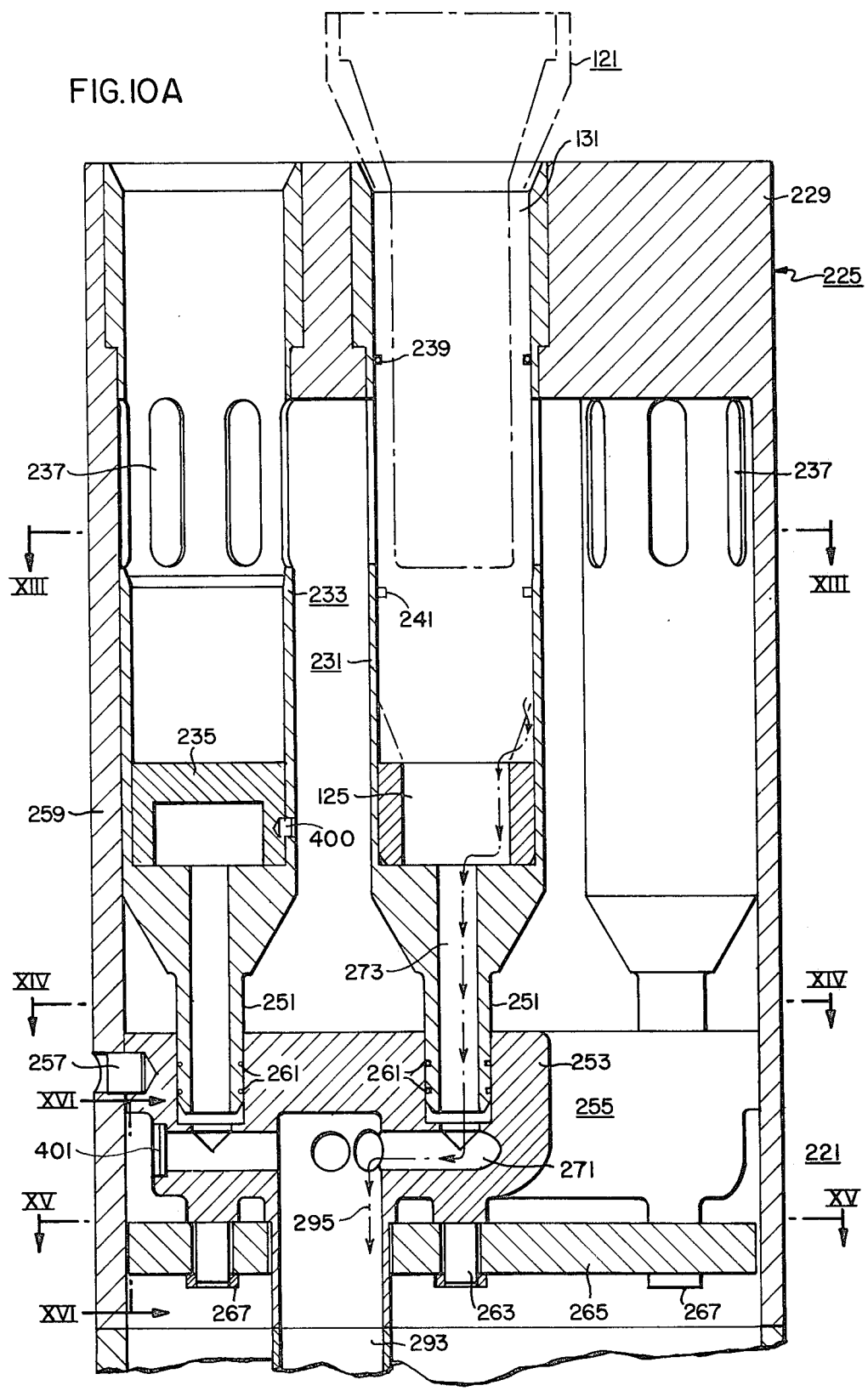
FIGS. 10A, 10B, 10C together are a view in section similar to FIG. 7, showing additional detail of a modular unit.
Figure 10B:
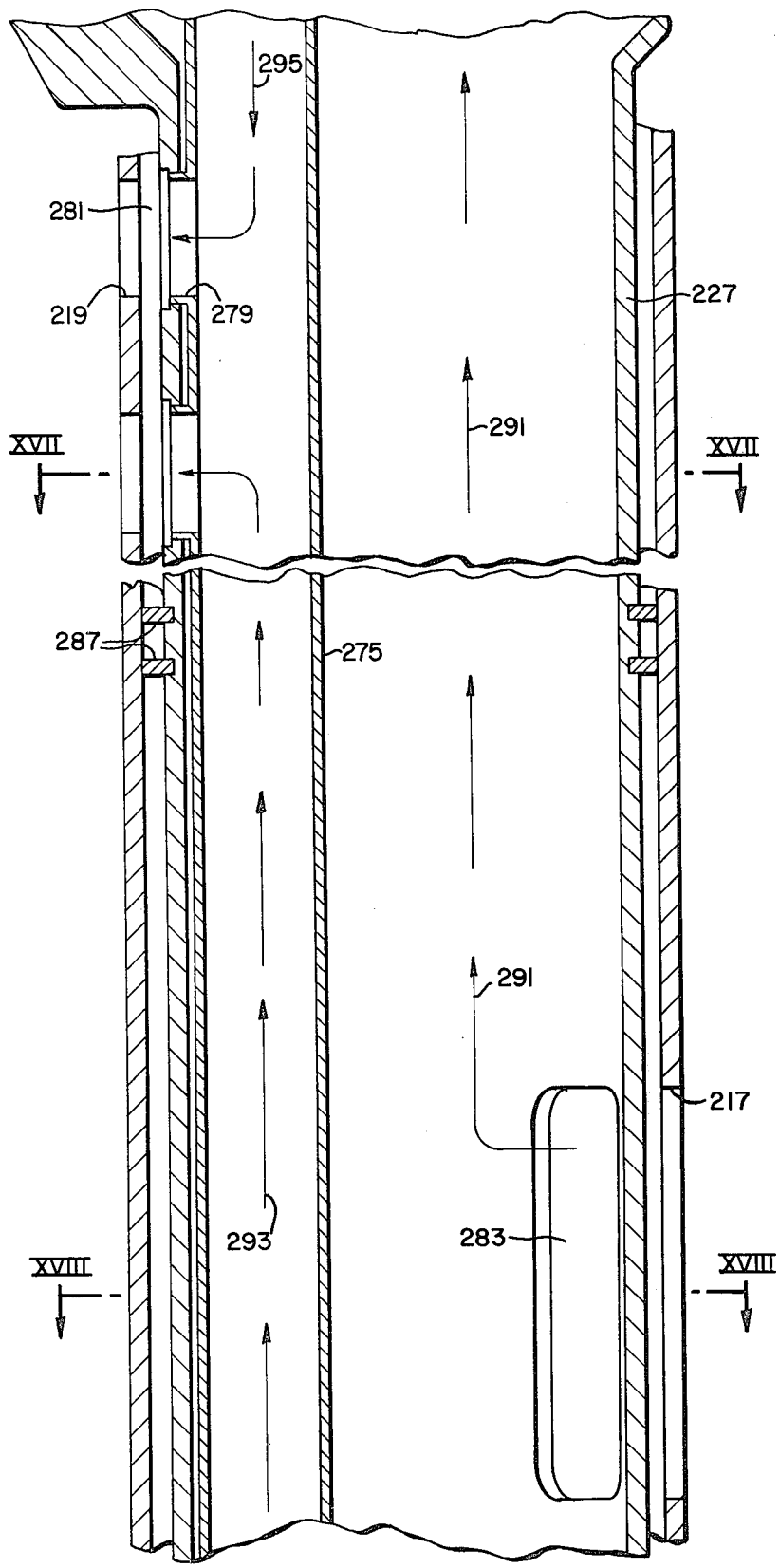
Figure 10C:
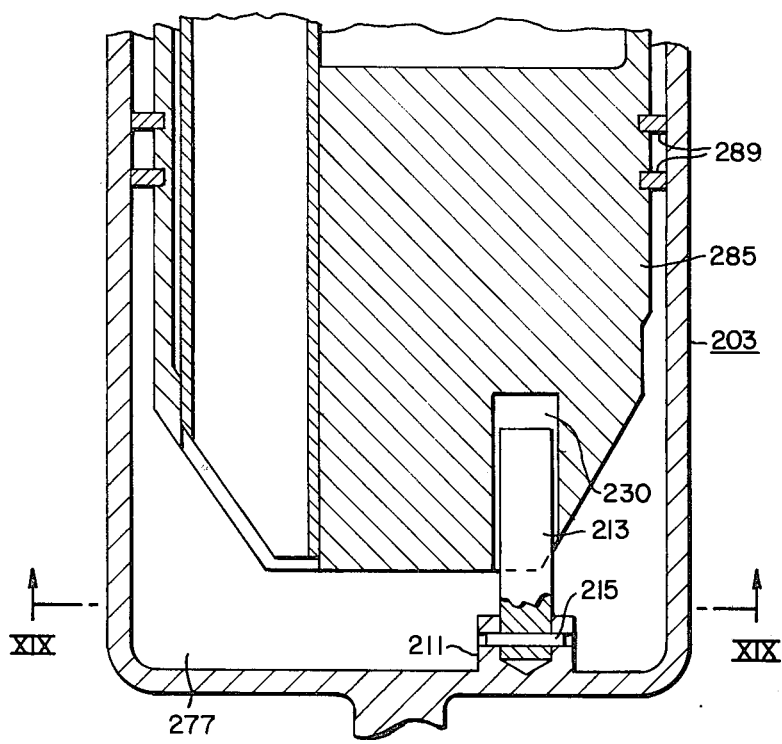
Figure 19:
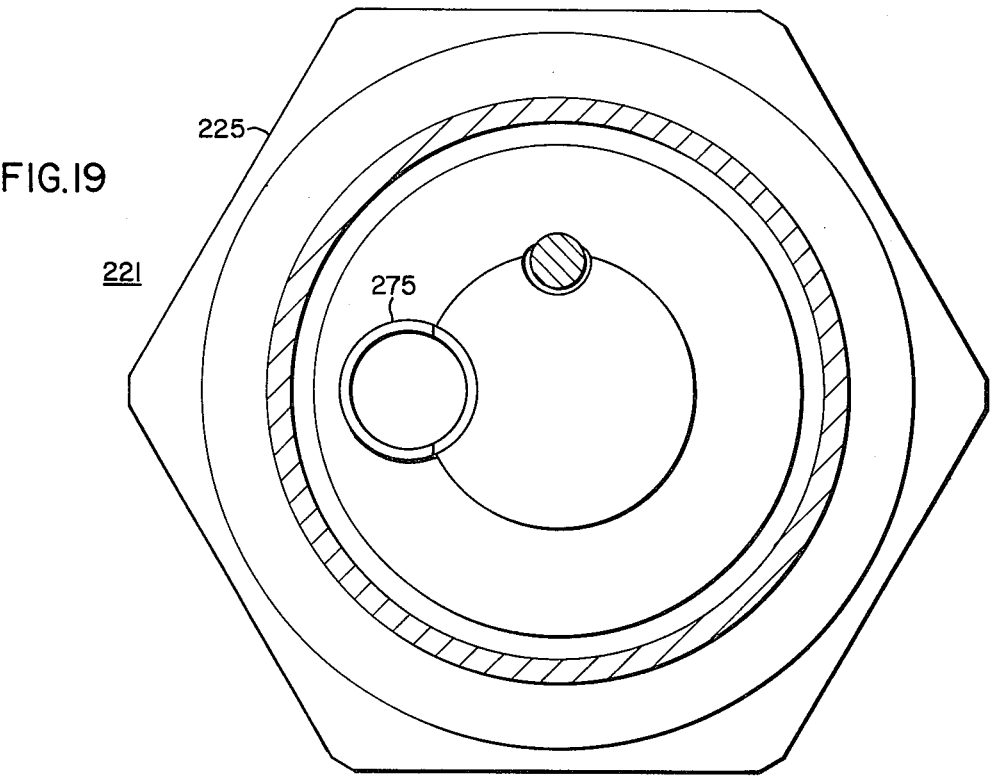
FIG. 19 is a plan view of the bottom of the modular unit.
Figure 12:
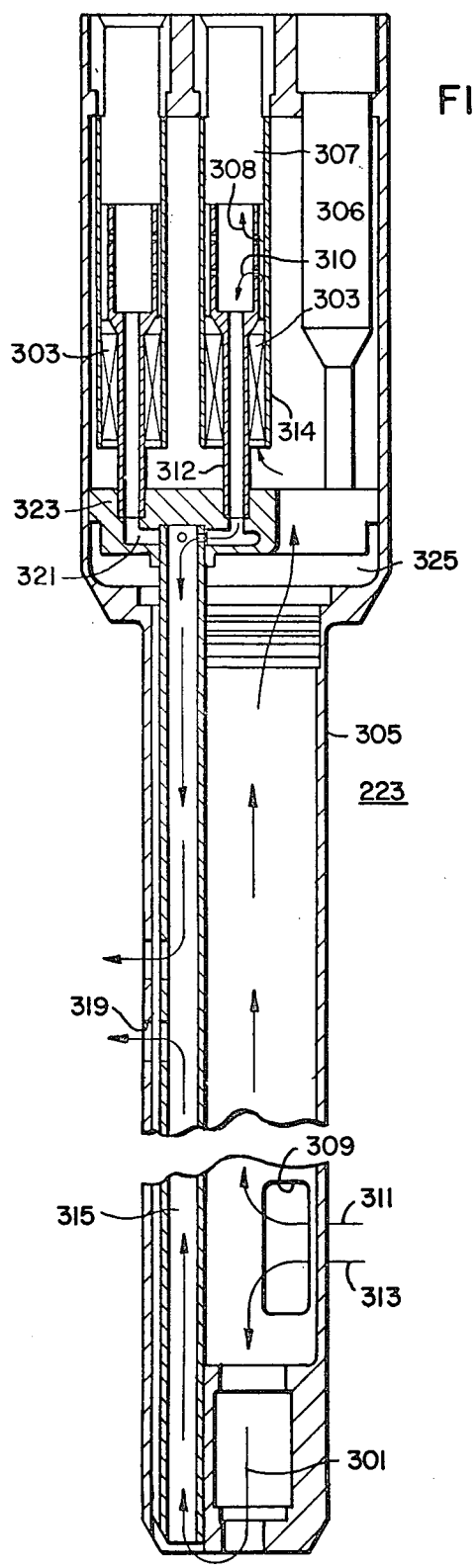
FIG. 12 is a view in section taken along line XII—XII of FIG. 11.
Figure 11:
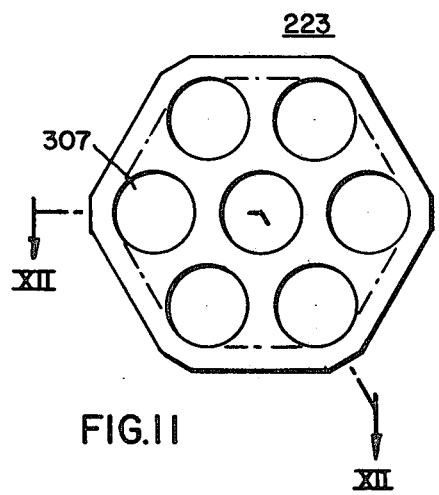
FIG. 11 is a plan view, partly diagrammatic, of the top of an inlet modular unit of another type.
Figure 15:
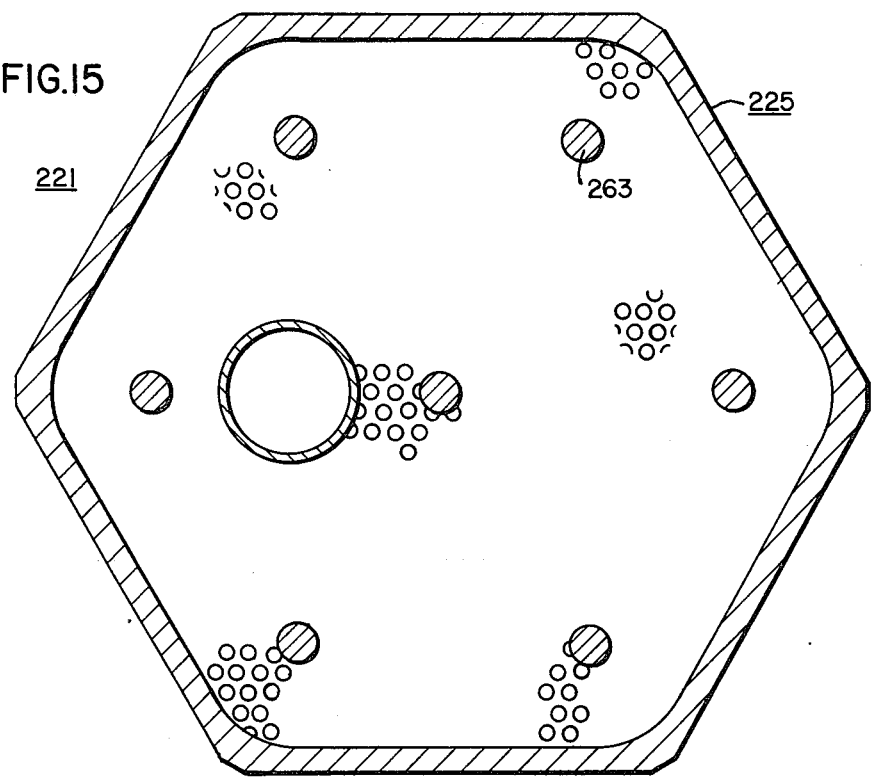
Figure 16:
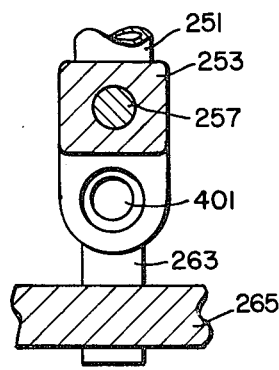

The stem 227 of the module 221 has openings 283 above its solid tip 285 which is aligned with openings 217 in the liner 203 (FIGS. 10B, 10C). On each side of these openings 217 and 283, seals 287 and 289, typically piston-ring seals, are provided. As shown by the arrows 291 the high-pressure fluid in the inlet plenum 25 flows into the stem 227 through openings 217, 283 up the stem, through the strainer 265, through the openings 237, through the opening in the ducts 129 and along the assemblies 103 or 107, as the case may be. The fluid is discharged at a low pressure into the outlet plenum 29. The seal 289 suppresses the flow of fluid below the modular unit 221 so that pressure balance is established. The unit 221 has a higher specific gravity than the fluid and is firmly held by gravity in the liner 203. Seal 287 also suppresses fluid flow in the annulus between the liner 203 and the module 221 above this seal. Leakage through seal 289 flows into vent pipe 275 through space 277 and out through openings 279, 281, 219 to the low-pressure regions of the vessel as shown by the broken line arrows 293. The leakage through the seal 241 flows through the cavity 271 into the vent pipe 275 as shown by the dot-dash arrows 295.

The modules 223 (FIGS. 11, 12) serve for receiving the fertile assemblies 111 and the shielding assemblies 115. Some of these assemblies require less cooling than the fuel assemblies 103 107 or the control-rod 117 119. To reduce the flow of fluid, these modules 223 include stacks 301 and 303 of orifice plates at the base of the stem 305 and within the receptacles 307. These stacks impede the flow of fluid producing a substantial pressure drop in the fluid. The fluid enters the openings 309 and follows two paths as shown by the arrows 311 and 313: a direct path 311 to the receptacles, and a by-pass path 313. The fluid in path 311 flows in a direct path through the orifice plates 303 into the fertile assemblies 111 and shielding assemblies 115. The fluid in path 313 flows through the orifice plates 301 into vent pipe 315 and thence out through opening 319. The fluid through the orifice plates 303 passes from the orifice plates 303 up between the shell 314 and a shell 306 with vertical holes (not shown) in it. The fluid passing through these holes takes two paths 308 and 310. The fluid in path 308 enters the duct plugged into the receptacle 307; the fluid in path 310 passes down stem 312 into vent pipe 315. Module 223 is in other respects similar to module 221 having spider 323 and strainer 325. Different assemblies in modules 223 require different coolant flow. These requirements are met by providing different numbers of orifice plates 301 and 303 or by omitting one or the other set of plates 301 and 303 altogether.

While a preferred embodiment has been disclosed herein, many modifications thereof are feasible. This invention is not to be restricted except insofar as is necessitated by the spirit of the prior art.

What we claim is:

1. A liquid metal cooled nuclear reactor having a pressure vessel and also having means for supplying a cooling liquid metal to said vessel, a nuclear core in said vessel bounded below by a lower support plate and bounded radially by a core barrel, said core barrel forming an annular region between said barrel and said vessel, said annular region being at a lower temperature than said core, said core having a plurality of core assemblies for generation and control of energy of nuclear fission, a plurality of liners mounted in said lower plate, an inlet modular unit removably mounted in each said liner held by gravity, each said unit having receptacles for receiving certain of said assemblies, said assemblies being removable from their corresponding receptacles, each said modular unit being pervious to the flow of said liquid metal, said liquid metal flowing into said modular unit and into the receptacle of said modular unit and along said assemblies received in said receptacle in thermal interexchange with said assemblies and upwardly through said core, the flow of said liquid along said assemblies producing a pressure drop is said liquid so that liquid emerging from said core is at a lower pressure than liquid entering said receptacle, and means for producing low pressure regions below said modular unit and below said assemblies to produce a pressure balance on said modular unit and assemblies and to prevent the ejection of said modular unit from said liner and of said assemblies from said receptacle, said means comprising leakage flow paths below said modular unit and below said assemblies and by-pass flow vent-pipe means, said last-named means including a vent pipe disposed within said module and a plurality of flow passageways disposed horizontally through said lower plate to the outer periphery of said core barrel and said annular region, said leakage flow paths passing from below said modular unit and said assemblies to said vent-pipe and then through said passageways to the outer periphery of said core barrel and said annular region.

2. A nuclear reactor comprising:
 a. a pressure vessel;
 b. means for supplying a liquid metal coolant to said vessel;
 c. a lower support plate within said vessel having flow passageways disposed horizontally therethrough;
 d. a nuclear core in said vessel above said support plate, said core having a plurality of nuclear fuel assemblies, said assemblies comprising assembly coolant inlet openings;
 e. a core barrel radially surrounding said core and affixed at its lower extremity to said support plate;
 f. a plurality of liners mounted in said support plate, said liners disposed above, through, and below said support plate and comprising liner coolant inlet openings below said lower plate;
 g. an inlet modular unit removably mounted in each said liner held by gravity, each said unit having receptacles for removably receiving certain of said core assemblies, each receptacle having receptacle inlet openings aligned with said assembly openings, each said modular unit being pervious to the flow of said coolant and further comprising module coolant inlet openings aligned with said liner coolant inlet openings and a vent pipe in flow communication with said passageways disposed through said support plate, said coolant flowing into said modular unit through said module openings and into the receptacles of said modular unit and along said assemblies received in said receptacles in thermal interexchange with said assemblies and upwardly through said core, the flow of said coolant along said assemblies producing a pressure drop in said coolant so that the coolant emerging from said core is at a lower pressure than coolant entering said receptacles;

h. first ring seals disposed between said assemblies and said receptacles above and below said aligned assembly and receptacle openings;

i. second ring seals disposed between said liners and said modular units above and below said aligned module and liner openings; and j. means for producing low pressure regions below said modular units and below said assemblies to produce a pressure balance on said modular units and assemblies and to prevent the ejection of said modular units from said liners and of said assemblies from said receptacles, said means comprising a liquid coolant flow path venting leakage passed said lower first ring seals and said lower second ring seals to lower pressure regions within said vessel, said lower pressure regions comprising an annular region formed between said vessel and said core barrel, whereby said coolant leakage passes from below said first and second ring seals to said vent pipe, through said pipe to said passageways, and through said passageways to said lower pressure annular region.

3. A nuclear reactor comprising:
a. a pressure vessel;
b. a core including a plurality of nuclear fuel assemblies disposed within said vessel;
c. a cylindrical core barrel within said vessel radially surrounding said core;
d. an annular region formed between said core barrel and said vessel;
e. apparatus disposed within said annular region including fuel transfer storage containers and a reactor vessel thermal liner;
f. a liquid metal coolant circulating through said vessel, core, and annular region, said coolant being at a lower temperature and lower pressure within said annular region than within said core; and
g. a structure disposed within said vessel below said core forming a singular lower coolant inlet plenum below said structure, said structure supporting said fuel assemblies and venting a portion of said liquid coolant from said lower plenum to said annular region and comprising:
  i. a support plate having flow passageways disposed horizontally therethrough from within said plate to the periphery thereof;
  ii. a plurality of liners permanently mounted in said plate extending above, through, and below said plate and having liner coolant inlet openings below said plate;
  iii. an inlet modular unit removably mounted in each said liner having:
    a. receptacles for removably receiving and providing coolant to said assemblies of said core,
    b. modular unit coolant inlet openings aligned with said liner coolant inlet openings, and
    c. a primary fluid flow path for passing coolant entering said module through said aligned openings upwardly to said receptacles,
  iv. ring seals between said liner and modular unit above and below said aligned coolant inlet openings;
  v. a vent pipe within each said modular unit in flow communication with the region between said liner and modular unit below the ring seal below said aligned openings and also in flow communication with said passageways;

whereby coolant from said lower coolant inlet plenum enters said liner through said liner coolant inlet openings and flows primarily into said modular unit and upwardly to said receptacles and said assemblies, and said coolant flows secondarily from below the ring seal below said aligned openings to said vent pipe, through said passageways, and into said annular region containing coolant at a lower temperature and lower pressure than coolant within said core.

* * * * *